(12) United States Patent
Nakayama

(10) Patent No.: US 6,177,762 B1
(45) Date of Patent: Jan. 23, 2001

(54) PLASMA DISPLAY PANEL HAVING MIXED GASES TO COUNTERACT SPUTTERING EFFECTS

(75) Inventor: Junichiro Nakayama, Shiki-gun (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/176,901

(22) Filed: Oct. 22, 1998

(30) Foreign Application Priority Data

Oct. 23, 1997 (JP) ................................... 9-291376

(51) Int. Cl.⁷ .................................................. H01J 17/44
(52) U.S. Cl. ........................................ 313/582; 313/637
(58) Field of Search .................................. 313/582, 637

(56) References Cited

U.S. PATENT DOCUMENTS

| | | | |
|---|---|---|---|
| 3,716,742 | * 2/1973 | Nakayama et al. | 313/582 |
| 3,801,851 | * 4/1974 | Andoh et al. | 313/582 |
| 3,811,061 | * 5/1974 | Nakayama et al. | 313/582 |
| 3,944,875 | * 3/1976 | Owaki et al. | 313/582 |
| 4,147,958 | * 4/1979 | Ahearn et al. | 313/582 |

OTHER PUBLICATIONS

T. Morita, et al, "Application of PALC Technology to 25–in. Full–Color Display", IDW '96, LA1–3, 1996, pp. 423–426.

* cited by examiner

*Primary Examiner*—Vip Patel
(74) *Attorney, Agent, or Firm*—Nixon & Vanderhye, P.C.

(57) ABSTRACT

The plasma address information display device of this invention includes a plasma address cell and a display medium layer which is addressed by the plasma address cell, the plasma address cell including: a substrate; a transparent thin substrate opposing to the substrate; a plurality of partitions made of dielectrics formed between the substrate and the transparent thin substrate; and electrodes disposed on a surface of the substrate facing the transparent thin substrate, wherein a mixed gas composed of an inactive gas and an active gas is sealed in plasma discharge spaces each surrounded by the substrate, the transparent thin substrate, and the plurality of partitions.

7 Claims, 6 Drawing Sheets

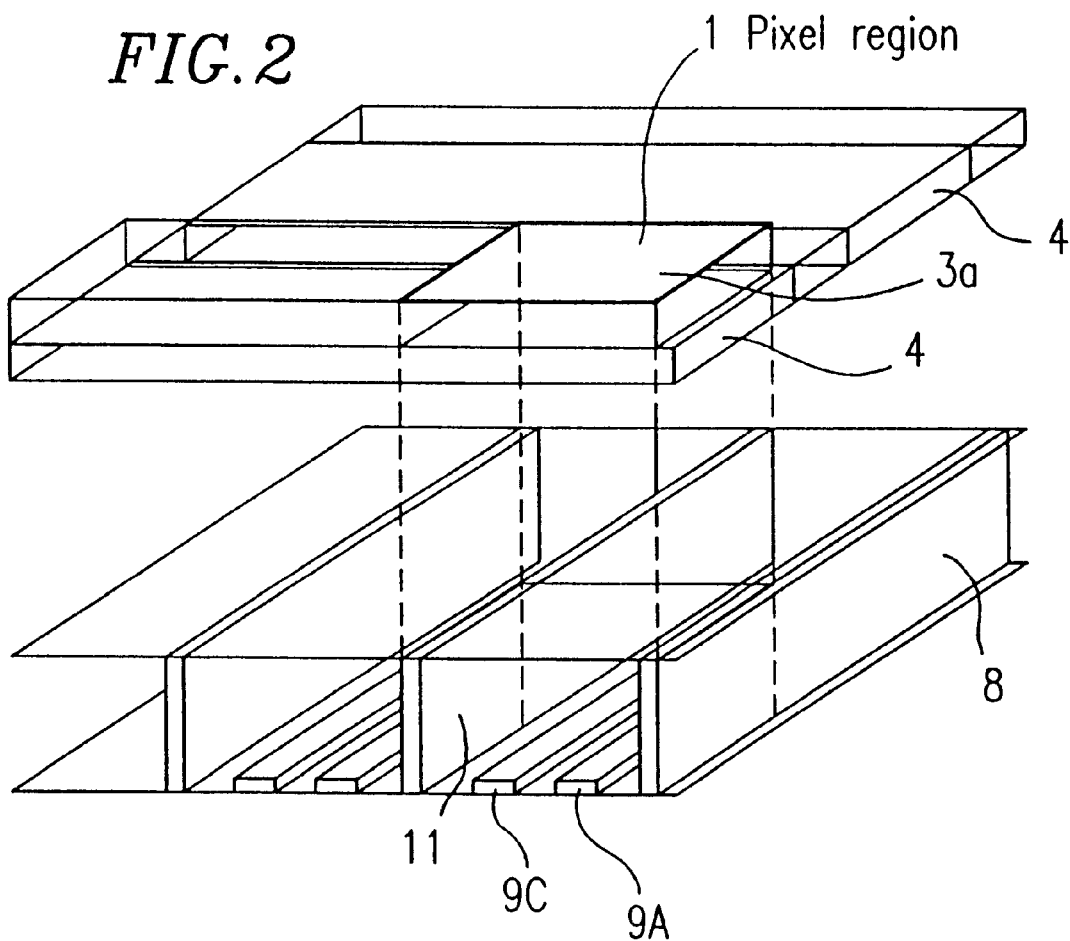

PLASMA DISPLAY PANEL HAVING MIXED GASES TO COUNTERACT SPUTTERING EFFECTS

BACKGROUND OF THE INVENTION

1. Field of the Invention

The present invention relates to a plasma address information display device used for a display apparatus and the like.

2. Description of the Related Art

The development of information display devices such as flat panel displays has already passed through the stage of small-size, monochrome devices realizing binarization, and proceeded to the stage of large-size, colored devices, gray-scale display and moving-image displays. The performance of such advanced information display devices has been improved year by year.

The configuration of a plasma address liquid crystal display device as one of such conventional information display devices will be described with reference to FIG. 5.

Referring to FIG. 5, the plasma address liquid crystal display device 300 includes a color filter substrate 30A, a plasma address cell 30B, and a liquid crystal layer 26 formed by injecting a liquid crystal material in a space between the color filter substrate 30A and the plasma address cell 30B. A backlight 32 is disposed on the surface of the plasma address cell 30B opposite to the surface thereof in contact with the liquid crystal layer 26.

The color filter substrate 30A includes a polarizing plate 21a, a transparent substrate 22a, color filters 23, transparent electrodes 24, and an alignment film 25a. The plasma address cell 30B includes a polarizing plate 21b, a transparent substrate 22b, partitions 28, anodes 29A and cathodes 29C as plasma discharge electrodes, a transparent thin substrate 27, and an alignment film 25b.

A rare gas such as He, Ne, Ar, Xe, or the like is sealed in a plurality of plasma discharge spaces 31 each surrounded by the transparent substrate 22b, the adjacent partitions 28, and the transparent thin substrate 27. The pressure of the rare gas in the plasma discharge spaces 31 is in the range of 10 to $10^4$ Pa, preferably in the range of $10^2$ to $5 \times 10^3$ Pa.

The conventional plasma address liquid crystal display device with the configuration described above has problems as follows, as disclosed in "IDW '96, LA1-3, p.423". Metal particles of the anodes 29A and the cathodes 29C as the plasma discharge electrodes may attach to the transparent thin substrate 27 due to a sputtering phenomenon occurring during plasma generation. The attachment of metal particles reduces the transmittance of the transparent thin substrate 27 and thus the plasma address liquid crystal display device 300, and also makes the transparent thin substrate 27 conductive, thereby generating color mixing.

SUMMARY OF THE INVENTION

The plasma address information display device of this invention includes a plasma address cell and a display medium layer which is addressed by the plasma address cell, the plasma address cell including: a substrate; a transparent thin substrate opposing to the substrate; a plurality of partitions made of dielectrics formed between the substrate and the transparent thin substrate; and electrodes disposed on a surface of the substrate facing the transparent thin substrate, wherein a mixed gas composed of an inactive gas and an active gas is sealed in plasma discharge spaces each surrounded by the substrate, the transparent thin substrate, and the plurality of partitions.

In one embodiment of the invention, the inactive gas includes at least one type of gas selected from the group consisting of He, Ne, Ar, and Xe, and the active gas includes at least one type of gas selected from the group consisting of $N_2$ and $O_2$.

In another embodiment of the invention, a gas pressure of the mixed gas sealed in the plasma discharge spaces is in the range of 10 to $10^4$ Pa.

In still another embodiment of the invention, the electrodes are composed of anodes and cathodes, and a voltage for generating plasma discharge is applied to the cathodes.

In still another embodiment of the invention, the plasma address information display device further includes an additional substrate located on a surface of the display medium layer opposite to a surface thereof in contact with the plasma address cell, wherein color filters and transparent electrodes are formed on the additional substrate, and a data voltage for writing data is applied to the transparent electrodes.

In still another embodiment of the invention, the plasma discharge spaces extend in a first direction and the transparent electrodes extend in a second direction crossing the first direction, and portions where the plasma discharge spaces and the transparent electrodes spatially overlap each other correspond to pixel regions of the plasma address information display device.

In a plasma address information display device of the present invention, a mixed gas composed of an inactive gas and an active gas is sealed in plasma discharge spaces each surrounded by a substrate, a thin substrate, and insulators disposed between the substrates. Metal particles sputtered from the electrodes in the plasma discharge spaces during plasma generation react with the active gas existing in the plasma discharge spaces before reaching to the thin substrate. Therefore, the reacted metal particles, not the metal particles themselves, attach to the thin substrate.

When $N_2$ and $O_2$ are used as the active gas, the metal particles sputtered from the electrodes react with the active gas to form a dielectric such as a nitride and an oxide. The dielectric is transparent unlike the metal. Therefore, the reduction of the transmittance can be prevented. In addition, this prevents the surface of the thin substrate from being made conductive, and thus prevents the generation of color mixing. Using $N_2$ and $O_2$ as the active gas is also advantageous in that these gases do not adversely affect a plasma state generated in the plasma discharge spaces.

The gas pressure of the mixed gas should preferably be in the range of 10 to $10^4$ Pa to provide a stable plasma state.

Furthermore, the existence of the active gas added to the plasm channel is considered to have caused the penning effect, causing the function of shortening the decay time of the plasma channel.

Thus, the invention described herein makes possible the advantage of providing a plasma address information display device capable of shortening the decay time, preventing reduction of the transmittance, and preventing the generation of color mixing.

This and other advantages of the present invention will become apparent to those skilled in the art upon reading and understanding the following detailed description with reference to the accompanying figures.

BRIEF DESCRIPTION OF THE DRAWINGS

FIG. 2 is a perspective view illustrating the configuration of a plasma discharge space and a transparent electrode of the plasma address liquid crystal display device of Examples 1, 2 and 3.

DESCRIPTION OF THE PREFERRED EMBODIMENTS

Hereinbelow, the present invention will be described by way of example with reference to the accompanying drawings. In the following examples, a plasma address liquid crystal display device is described as an example of the plasma address information display device according to the present invention. However, it is understood that the present invention is not limited to the plasma address liquid crystal display device.

The present invention may be applied to DC-type plasma display panel (PDP) display, for example.

The active gas ($N_2$, $O_2$) as used herein means a gas which reacts with a metal used for an electrode (Ni, Al, Ta, W, Cu, Cr, Ag, Au, Pt, Ti, Co, Fe, Zn).

EXAMPLE 1

A plasma address liquid crystal display device 100 of Example 1 according to the present invention will be described with reference to FIGS. 1, 2, 3A to 3F, and 4.

Figure 1:
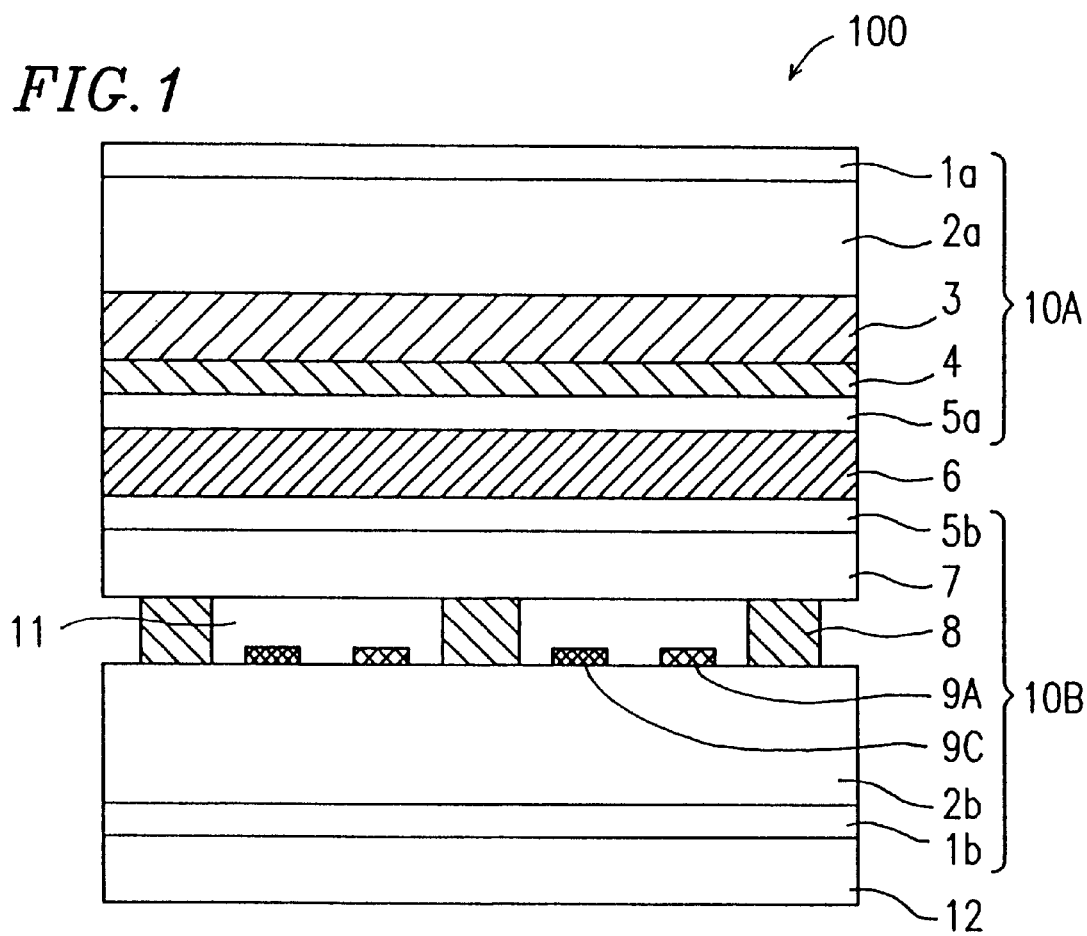
FIG. 1 is a sectional view of a plasma address liquid crystal display device of Examples 1, 2, and 3 according to the present invention.

Referring to FIG. 1, the plasma address liquid crystal display device 100 of this example includes a color filter substrate 10A, a plasma address cell 10B, and a liquid crystal layer 6 formed by injecting a liquid crystal material in a space between the color filter substrate 10A and the plasma address cell 10B. A backlight 12 is disposed on the surface of the plasma address cell 10B opposite to the surface thereof in contact with the liquid crystal layer 6.

The color filter substrate 10A includes a polarizing plate 1a, a transparent substrate 2a made of glass with a thickness of 0.5 to 2.0 mm, a color filter layer 3, transparent electrodes 4 made of ITO, $SnO_2$, ITO+$SnO_2$, or the like, and an alignment film 5a made of a polymer. The plasma address cell 10B includes a polarizing plate 1b, a transparent substrate 2b made of glass with a thickness of 0.5 to 3.0 mm, partitions 8 made of $SiO_2$ or the like, stripe-shaped anodes 9A and cathodes 9C made of a metal such as Ni as plasma discharge electrodes, a transparent thin substrate 7 made of glass with a thickness of 10 to 100 μm, and an alignment film 5b made of a polymer. The width of each of the partitions 8 is approximately 100 μm, the distance between the adjacent partitions 8 is approximately 700 μm, and the line width of the plasma discharge electrodes 9A and 9C is approximately 150 μm.

In the plasma address cell 10B, He+Ne as an inactive gas and $N_2$ as an active gas are sealed, under partial pressures of 2700 Pa and 300 Pa, respectively, in a plurality of plasma discharge spaces (plasma channels) 11 each surrounded by the transparent substrate 2b, the adjacent partitions 8, and the transparent thin substrate 7. As shown in FIG. 2, the plurality of plasma channels 11 and the transparent electrodes 4 of the color filter substrate 10A are disposed in a "twisted" relationship therebetween as viewed from the side of the polarizing plate 1a. More specifically, while the stripe-shaped plasma channels 11 extend in a first direction, the stripe-shaped transparent electrodes 4 extend in a second direction crossing the first direction. The portions where the plasma channels 11 and the transparent electrodes 4 spatially overlap each other correspond to pixel regions of the plasma address information display device.

In the case of a color display device, the color filter layer 3 includes color filter portions 3a of different colors arranged in correspondence with the transparent electrodes 4. In this case, the pixel regions are regions where the color filter portions 3a and the plasma channels 11 spatially overlap each other.

The plasma address liquid crystal display device 100 with the above configuration performs information write and retain operations in a manner as illustrated in FIGS. 3A to 3F.

Figure 3A:
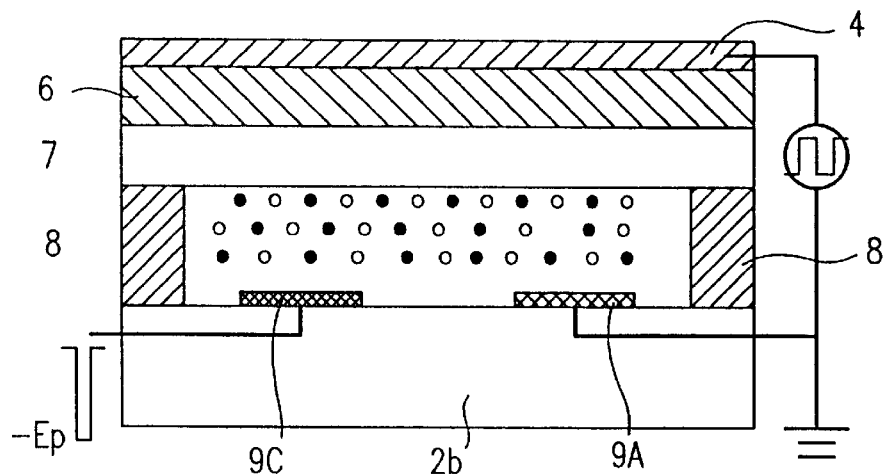
FIGS. 3A to 3F are views illustrating the operation of a plasma address cell of the plasma address liquid crystal display device of Examples 1, 2, and 3.

First, as shown in FIG. 3A, a voltage of 100 to 500 V is applied between the anode 9A and the cathode 9C. More specifically, a voltage –Ep of –300 to –450 V, for example, is applied to the cathode 9C to generate plasma discharge. In FIGS. 3A through 3F, black circles (●) represent negatively-charged particles while white circles (○) represent positively-charge particles among ionized particles of a plasma gas for generating plasma.

Figure 3B:
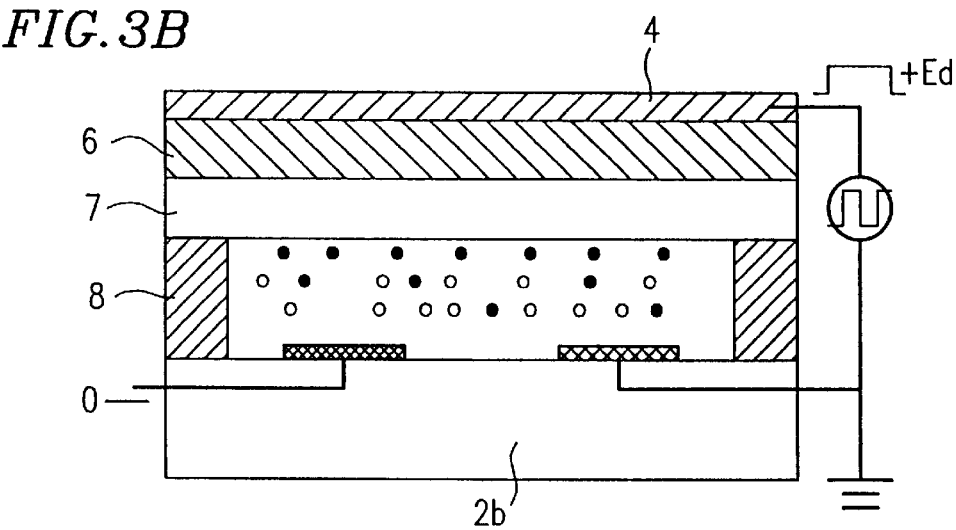
Figure 3C:
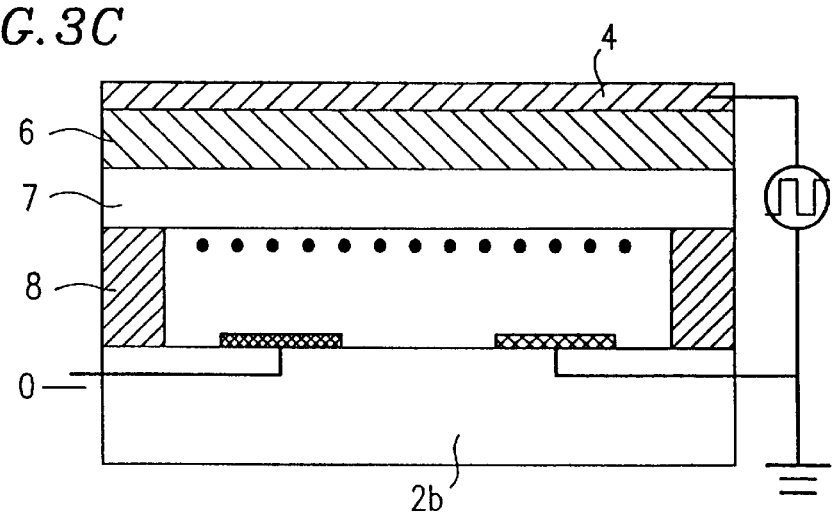

As shown in FIG. 3B, a voltage +Ed of +50 to +100 V is then applied to the transparent electrode 4 of the color filter substrate to write information into the liquid crystal layer 6. As shown in FIG. 3C, the information is retained during a predetermined period even when discharging is terminated since the interface with the transparent thin substrate 7 has been negatively charged.

Figure 3D:
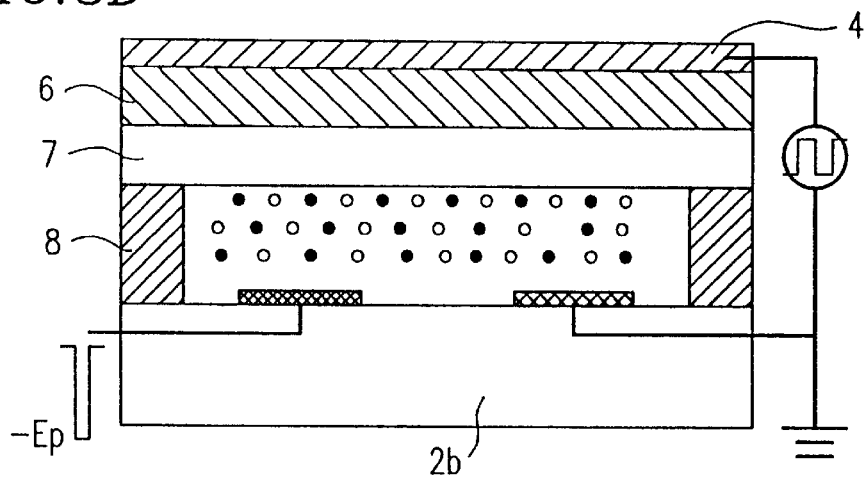
Figure 3E:
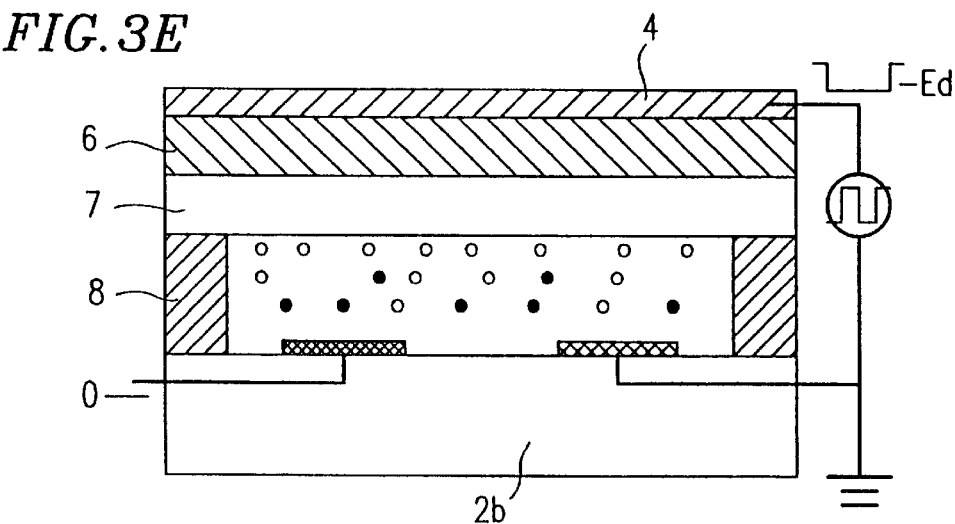
Figure 3F:
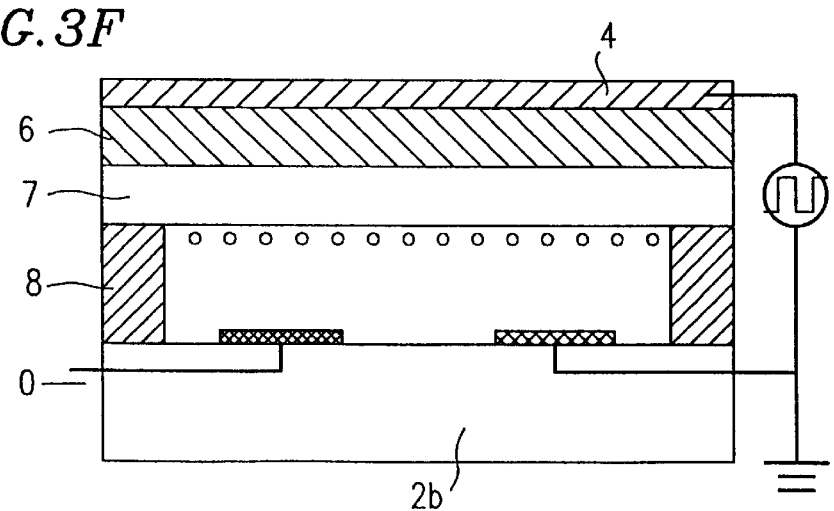

FIGS. 3D to 3F illustrate the case where the interface with the transparent thin substrate 7 is desired to be positively charged. In this case, a voltage –Ed of –50 to –100 V is applied to the transparent electrode 4 of the color filter substrate 10A. In practice, in order to prevent a DC component of the voltage from being applied to the liquid crystal layer 6, an AC voltage of 50 to 100 V is applied between the anode 9A and the transparent electrode 4.

Figure 4:
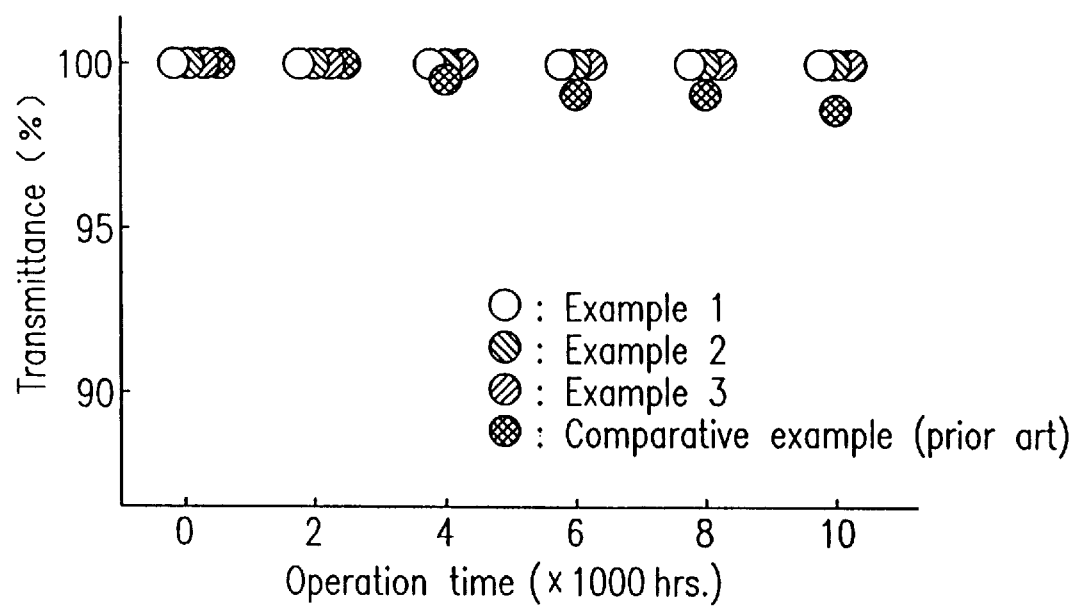
FIG. 4 is a view showing the relationship between the operation time and the transmittance of Examples 1, 2, and 3 and a comparative example.
Figure 5:
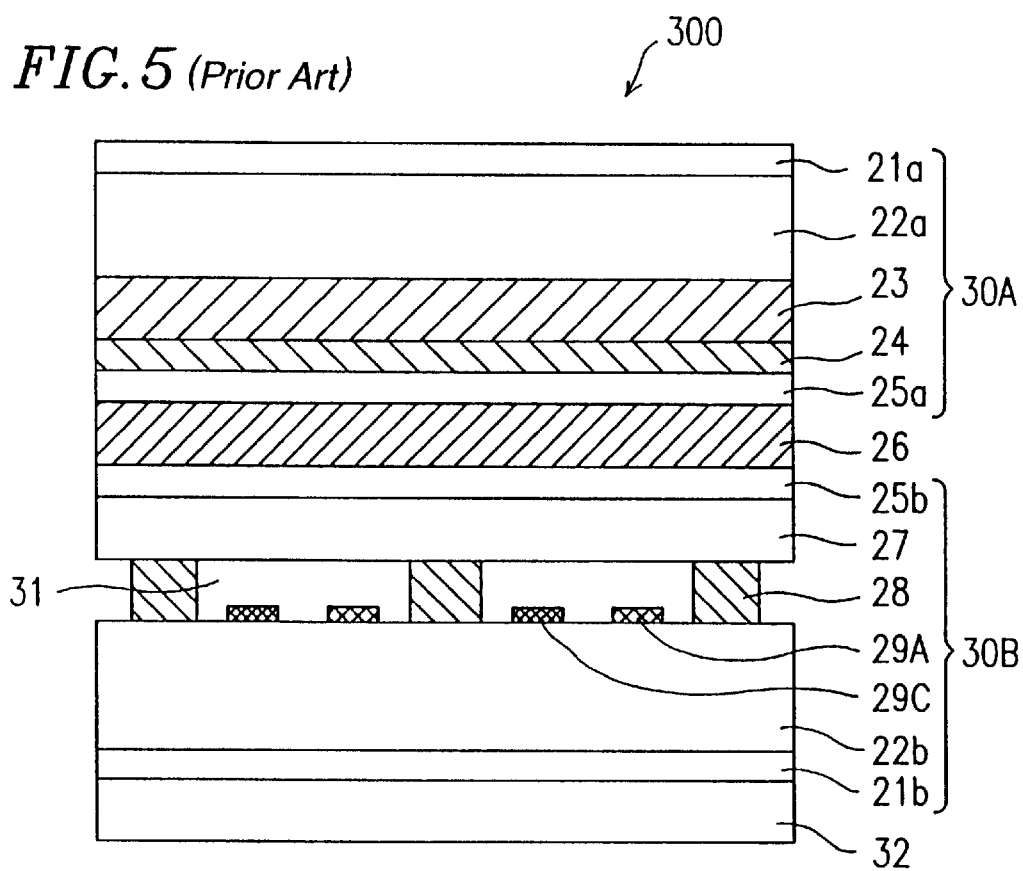
FIG. 5 is a sectional view of a conventional plasma address liquid crystal display device.

FIG. 4 shows the relationship between the operation time and the transmittance in Example 1 where the mixed gas composed of the inactive gas (He+Ne) and the active gas ($N_2$) is used as the plasma gas, as well as the relationship between the operation time and the transmittance in a comparative example (the conventional example described above) where only the inactive gas is used.

As is observed from FIG. 4, in Example 1, the transmittance has hardly changed after the lapse of 10000 hours. On the contrary, in the comparative example, the transmittance gradually reduces with time after the lapse of about 4000 hours.

The reason is considered to be as follows. In the comparative example where only a rare gas such as He, Ne, Ar, Xe, or the like is used as the plasma gas, metal particles sputtered from the plasma discharge electrode material attach to the transparent thin substrate in the state of metal which is opaque. On the contrary, in Example 1, metal particles sputtered from the plasma discharge electrode material attach to the transparent thin substrate 7 in the state of a transparent or near-transparent nitride by reacting with the nitrogen existing in the plasma channels 11. Further, since such a nitride is a dielectric, the transparent thin substrate 7 is not made conductive, and thus color mixing is not generated. Moreover, the $N_2$ gas used as the active gas does not adversely affect the plasma state such as the stability of plasma discharge in the plasma channels 11.

Furthermore, the plasma address liquid crystal display device of this example has also been recognized to have a function of shortening the time period, i.e., decay time, from the time a voltage application between the anode and the cathode is turned off until the time the plasma discharge is quenched (i.e., the state where a voltage no longer remains between the transparent electrode 4 and the plasma channel 11) as compared with the conventional case. Specifically, the decay time was several $\mu$s in this example, while it was 10 to several tens of $\mu$s in the conventional case.

The above effect is considered to be generated due to a phenomenon generally called the Penning effect. The Penning effect is a phenomenon where, when a certain type of gas is mixed with another type of gas, the discharge start voltage of the resultant mixed gas can be reduced. In this example, the existence of the active gas, $N_2$, added to the plasma channel is considered to have caused the Penning effect, increasing the ratio of apparent plasma-excited gas molecules and thereby causing the above-described function.

EXAMPLE 2

A plasma address liquid crystal display device of Example 2 according to the present invention will be described with reference to FIGS. 1, 2, 3A to 3F, and 4.

The configuration and operation principle of the plasma address liquid crystal display device of this example are the same as those of the plasma address liquid crystal display device 100 of Example 1, and thus the same figures, FIGS. 1, 2, and 3A to 3F, are used for this example.

In this example, Ar as an inactive gas and $N_2$ as an active gas are sealed, under partial pressures of 2800 Pa and 200 Pa, respectively, in the plurality of plasma discharge spaces (plasma channels) 11 each surrounded by the transparent substrate 2b, the adjacent partitions 8, and the transparent thin substrate 7. Alternatively, Xe as an inactive gas and $N_2$ as an active gas may be contained under partial pressures of 2800 Pa and 200 Pa, respectively.

FIG. 4 shows the relationship between the operation time and the transmittance in Example 2 where the mixed gas composed of the inactive gas (Ar or Xe) and the active gas ($N_2$) is used as the plasma gas, as well as the relationship between the operation time and the transmittance in the comparative example (the conventional example) where only the inactive gas is used.

As is observed from FIG. 4, in Example 2, the transmittance has hardly changed after the lapse of 10000 hours. On the contrary, in the comparative example, the transmittance gradually reduces with time after the lapse of about 4000 hours.

The reason is considered to be as follows. In this example, as in Example 1, since $N_2$ is used as the active gas, metal particles sputtered from the plasma discharge electrode material attach to the transparent thin substrate 7 as a transparent or near-transparent nitride by reacting with the nitrogen. Further, since such a nitride is a dielectric, the transparent thin substrate 7 is not made conductive, and thus color mixing is not generated.

Furthermore, the plasma address liquid crystal display device of this example has also been recognized to have a function of shortening the time period, i.e., decay time, from the time a voltage application between the anode and the cathode is turned off until the time the plasma discharge is quenched (i.e., the state where a voltage no longer remains between the transparent electrode 4 and the plasma channel 11) as compared with the conventional case. Specifically, the decay time was several $\mu$s in this example, while it was 10 to several tens of $\mu$s in the conventional case.

In this example, the existence of the active gas, $N_2$, added to the plasma channel is considered to have caused the Penning effect, increasing the ratio of apparent plasma-excited gas molecules and thereby causing the above-described function.

EXAMPLE 3

A plasma address liquid crystal display device of Example 3 according to the present invention will be described with reference to FIGS. 1, 2, 3A to 3F, and 4.

The configuration and operation principle of the plasma address liquid crystal display device of this example are the same as those of the plasma address liquid crystal display device 100 of Example 1, and thus the same figures, FIGS. 1, 2, and 3A to 3F, are used for this example.

In this example, Xe as an inactive gas and $O_2$ as an active gas are sealed, under partial pressures of 2950 Pa and 50 Pa, respectively, in the plurality of plasma discharge spaces (plasma channels) 11 each surrounded by the transparent substrate 2b, the adjacent partitions 8, and the transparent thin substrate 7. Alternatively, Xe as an inactive gas and $N_2+O_2$ as an active gas may be contained under partial pressures of 2950 Pa and 50 Pa, respectively.

FIG. 4 shows the relationship between the operation time and the transmittance in Example 3 where the mixed gas composed of the inactive gas (Xe) and the active gas ($O_2$ or $N_2+O_2$) is used as the plasma gas, as well as the relationship between the operation time and the transmittance in the comparative example (the conventional example) where only the inactive gas is used.

As is observed from FIG. 4, in Example 3, the transmittance has hardly changed after the lapse of 10000 hours. On the contrary, in the comparative example, the transmittance gradually reduces with the time after the lapse of about 4000 hours.

The reason is considered to be as follows. In this example, since $O_2$ or $N_2+O_2$ is used as the active gas, metal particles sputtered from the plasma discharge electrode material attach to the transparent thin substrate 7 as a transparent or near-transparent oxide by reacting with the oxygen. Further, since such an oxide is a dielectric, the transparent thin substrate is not made conductive, and thus color mixing is not generated. Moreover, The $O_2$ or $N_2+O_2$ gas used as the active gas does not adversely affect the plasma state in the plasma channels 11.

Furthermore, the plasma address liquid crystal display device of this example has also been recognized to have a function of shortening the time period, i.e., decay time, from the time a voltage application between the anode and the cathode is turned off until the time the plasma discharge is quenched (i.e., the state where a voltage no longer remains between the transparent electrode 4 and the plasma channel 11) as compared with the conventional case. Specifically, the decay time was several $\mu$s in this example, while it was 10 to several tens of $\mu$s in the conventional case.

In this example, the existence of the active gas, $O_2$ or $N_2+O_2$, added to the plasma channel is considered to have caused the Penning effect, increasing the ratio of apparent plasma-excited gas molecules and thereby causing the above-described function.

In Examples 1 to 3 described above, the anodes 9A and the cathodes 9C as the plasma discharge electrodes made of a metal such as Ni are directly formed on the transparent substrate 2b made of glass with a thickness of 0.5 to 3.0 mm. In order to improve the adhesiveness between the plasma discharge electrodes and the transparent substrate 2b, an underlying film made of $SiO_2$, for example, may be formed therebetween.

In the above examples, the partitions 8 and the anodes 9A and the cathodes 9C as the plasma discharge electrodes are formed by printing or sand blasting. Another formation method may also be used as long as the resultant partitions and electrodes realize the above functions. Although the partial pressure of the active gas is in the range of 0.5 to 10% of the entire gas pressure in the above examples, it is not restricted to this range.

In the above examples, the transmission type liquid crystal display device using a backlight was described. The present invention can also be applicable to a reflection type liquid crystal display device.

Thus, as described above, in the plasma address information display device according to the present invention, the plasma address cell is configured to seal a mixed gas composed of an inactive gas and an active gas in the plasma discharge spaces each surrounded by the transparent substrate, the transparent thin substrate, and the partitions made of insulators disposed between the substrates. Accordingly, metal particles sputtered from the plasma discharge electrodes in the plasma discharge spaces during plasma generation react with the active gas existing in the plasma discharge spaces before reaching to the thin substrate. Therefore, the reacted metal particles, not the unreacted metal particles, attach to the thin substrate. Since $N_2$ and $O_2$ are used as the active gas, the metal particles sputtered from the plasma discharge electrodes react with the active gas to form a transparent or near-transparent compound such as a nitride and an oxide. This prevents reduction of the transmittance of the transparent thin substrate, realizing bright display. Further, since the nitride and oxide are dielectrics, they do not cause the transparent thin substrate to become conductive. This further prevents reduction of the transmittance and thus preventing color mixing from being generated. Moreover, the $N_2$ and $O_2$ gases used as the active gas do not adversely affect the plasma state in the plasma channels. Furthermore, the plasma discharge can be quickly terminated, allowing for high-speed switching.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A plasma address information display device comprising a plasma address cell and a display medium layer which is addressed by the plasma address cell, the plasma address cell including: a substrate; a transparent thin substrate opposing to the substrate; a plurality of partitions made of dielectrics formed between the substrate and the transparent thin substrate; and electrodes disposed on a surface of the substrate facing the transparent thin substrate, wherein a mixed gas composed of an inactive gas and an active gas is sealed in plasma discharge spaces each surrounded by the substrate, the transparent thin substrate, and the plurality of partitions, wherein metal particles which are sputtered from the electrodes and which attach to the transparent thin substrate have been rendered transparent or near transparent by reacting with the active gas.

2. A plasma address information display device according to claim 1, wherein the inactive gas includes at least one type of gas selected from the group consisting of He, Ne, Ar, and Xe, and the active gas includes at least one type of gas selected from the group consisting of $N_2$ and $O_2$.

3. A plasma address information display device according to claim 1, wherein a gas pressure of the mixed gas sealed in the plasma discharge spaces is in the range of 10 to $10^4$ Pa.

4. A plasma address information display device according to claim 1, wherein the electrodes are composed of anodes and cathodes, and a voltage for generating plasma discharge is applied to the cathodes.

5. A plasma address information display device according to claim 1, further comprising an additional substrate located on a surface of the display medium layer opposite to a surface thereof in contact with the plasma address cell, wherein color filters and transparent electrodes are formed on the additional substrate, and a data voltage for writing data is applied to the transparent electrodes.

6. A plasma address information display device according to claim 5, wherein the plasma discharge spaces extend in a first direction and the transparent electrodes extend in a second direction crossing the first direction, and portions where the plasma discharge spaces and the transparent electrodes spatially overlap each other correspond to pixel regions of the plasma address information display device.

7. A plasma address information display device according to claim 1, wherein the metal particles are dielectric.

* * * * *